United States Patent
Yelland et al.

(10) Patent No.: US 8,310,081 B2
(45) Date of Patent: Nov. 13, 2012

(54) POWER LINE COMMUNICATIONS COUPLER FOR EFFECTING SIGNAL COUPLING BETWEEN ELECTRIC SIGNALING EQUIPMENT AND AN ELECTRIC POWER SYSTEM

(75) Inventors: Donald Malcolm Ross Yelland, Hornsby (AU); Brent David Allwood, Buttaba (AU)

(73) Assignee: ADC GmbH, Berlin (DE)

( * ) Notice: Subject to any disclaimer, the term of this patent is extended or adjusted under 35 U.S.C. 154(b) by 625 days.

(21) Appl. No.: 12/295,807

(22) PCT Filed: Apr. 4, 2007

(86) PCT No.: PCT/AU2007/000450
§ 371 (c)(1),
(2), (4) Date: Nov. 10, 2009

(87) PCT Pub. No.: WO2007/112507
PCT Pub. Date: Oct. 11, 2007

(65) Prior Publication Data
US 2010/0046642 A1 Feb. 25, 2010

(30) Foreign Application Priority Data
Apr. 4, 2006 (AU) ................................ 2006901735

(51) Int. Cl.
*H02J 1/00* (2006.01)
*H02J 3/00* (2006.01)
*H04B 3/54* (2006.01)

(52) U.S. Cl. ........................................ 307/1; 340/310.17
(58) Field of Classification Search .................. 307/1, 3, 307/DIG. 1; 340/310.11, 310.16, 310.17; 375/257; 361/66, 68
See application file for complete search history.

(56) References Cited

U.S. PATENT DOCUMENTS

| 6,690,283 | B2 * | 2/2004 | Nemoto et al. ............... 340/664 |
| 6,844,810 | B2 | 1/2005 | Cern |
| 7,145,440 | B2 | 12/2006 | Gerszberg et al. |
| 2006/0244571 | A1 * | 11/2006 | Yaney et al. ............. 340/310.17 |
| 2006/0262881 | A1 * | 11/2006 | Cern ............................. 375/300 |
| 2007/0116257 | A1 * | 5/2007 | Duran et al. .................. 379/413 |
| 2009/0019634 | A1 * | 1/2009 | Lipponen ......................... 4/524 |

FOREIGN PATENT DOCUMENTS
WO  WO 98/33258  7/1998
WO  WO 00/49726  8/2000
* cited by examiner

*Primary Examiner* — Carlos Amaya
(74) *Attorney, Agent, or Firm* — Merchant & Gould P.C.

(57) ABSTRACT

A power line communications coupler for effecting signal coupling between electric signalling equipment and an electric power system, said coupler including a fuse coupleable to a power line of said electric power system; and a signal coupler in electrical communication with said fuse and being coupleable to said signalling equipment.

12 Claims, 9 Drawing Sheets ical Field of the Invention

The present invention relates to a power line communications coupler.

BACKGROUND OF THE INVENTION

Power line communication involves sending electric data signals through electrically conductive power cables together with electric power signals. Networks for distributing electric power signals constitute the largest deployed networks in the world. Such networks can be used for electric data signal transmission. Numerous protocols have been developed into standards governing transmission of electric data signals through power lines. The coupling of these electric data signals to and from electrically conductive power cables safely and in compliance with government regulations while maintaining low signal loss is key to the successful deployment of these power line communications systems.

U.S. Pat. No. 7,145,440, for example, discloses a broadband coupler capable of direct electrical connection to an energised power line. The coupler includes a conductive portion movable by an adjustable member from a non-conducting retracted position spaced apart from the power transmission line to a forward conducting position in electrical contact with the power line. An insulated arm supports the coupler on the power line. A base on the coupler is engageable with a remotely activated tool in order to accomplish the electrical connection in a safe and secure manner.

In U.S. Pat. No. 7,145,440, broadband data signals are sent to and from customer premises along the shared energized power lines. New coupler connections to the energized power lines allow the additional broadband customers and/or repeaters to join the communication system. Also couplers taught by U.S. Pat. No. 7,145,440 may provide connections to control electronics, routers, wireless transceivers, and may allow the broadband signals to bypass transformers on the power lines.

To minimise signal loss this coupling normally takes place directly on high power cables these being the core electricity conductors within an electrical network thus requiring bulky high current rupturing fuses and fuse holders and a direct physical connection to the electrical system with no way to easily determine or maintain the efficiency of this physical connection for the disproportionately small power line communications signals compared to the electrical power.

It is generally desirable to overcome or ameliorate one or more of the above mentioned difficulties, or at least provide a useful alternative.

SUMMARY OF THE INVENTION

In accordance with one aspect of the invention, there is provided a power line communications coupler for effecting signal coupling between electric signalling equipment and an electric power system, said coupler including a fuse coupleable to a power line of said electric power system; and a signal coupler in electrical communication with said fuse and being couplable to said signalling equipment.

Preferably, the fuse and the signal coupler are substantially arranged within a housing.

Preferably, the housing includes a host fuse holder.

BRIEF DESCRIPTION OF THE DRAWINGS

Preferred embodiments of the present invention are hereafter described, by way of non-limiting example only, with reference to the accompanying drawing in which.

DETAILED DESCRIPTION OF PREFERRED EMBODIMENTS OF THE INVENTION

Figure 1:
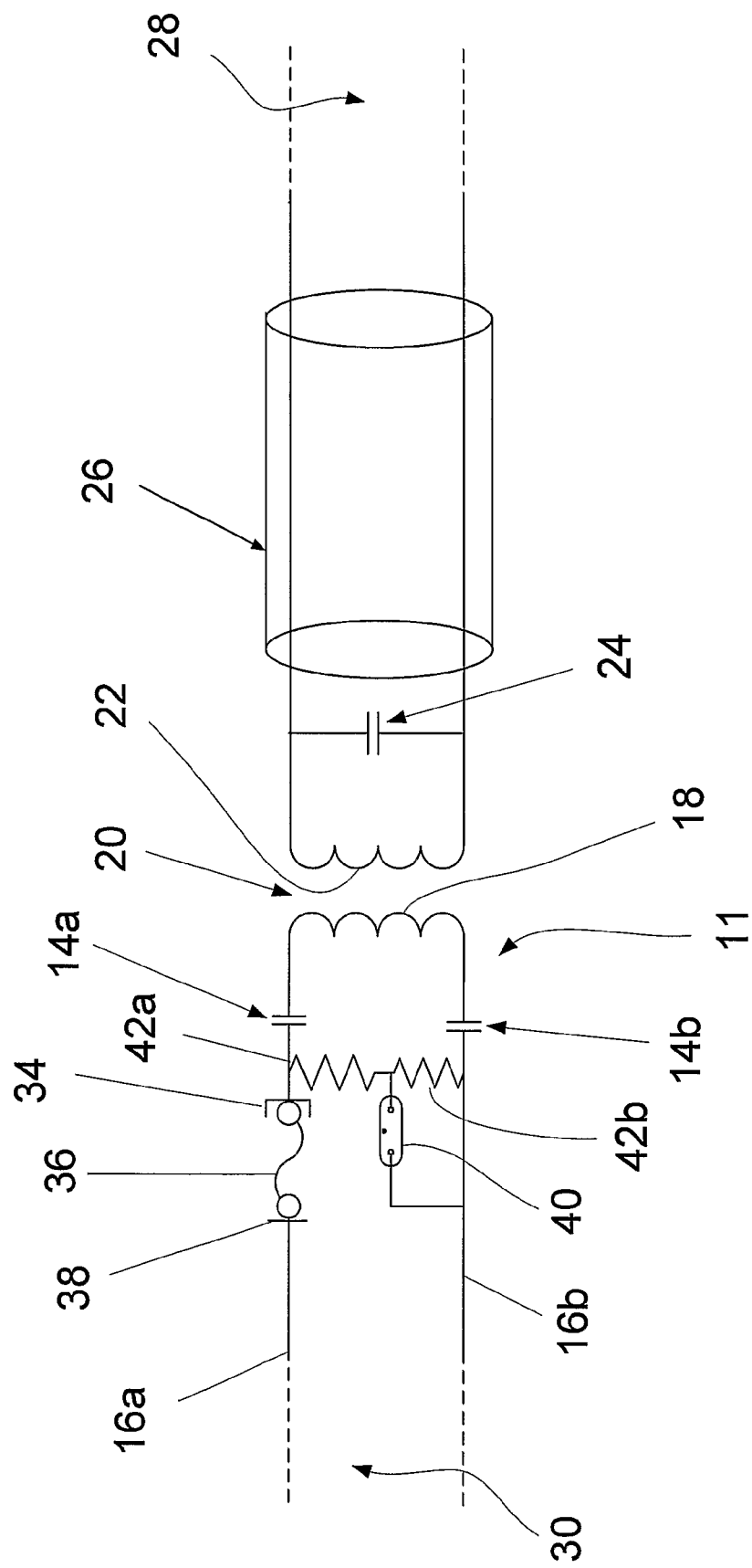
FIG. 1 is a circuit diagram of a preferred embodiment of the invention.
Figure 2:
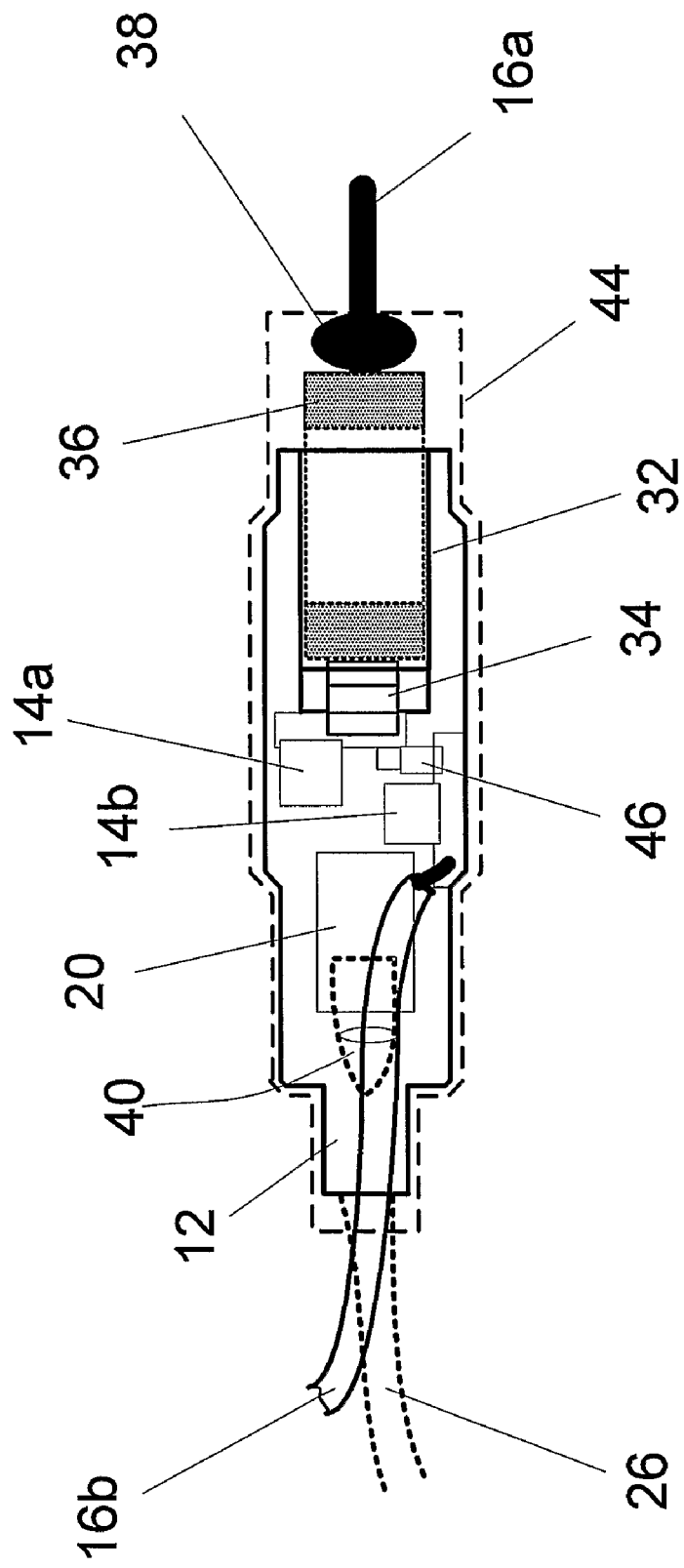
FIG. 2 is a diagrammatic illustration showing the components of the embodiment of the invention shown in FIG. 1.
Figure 3:
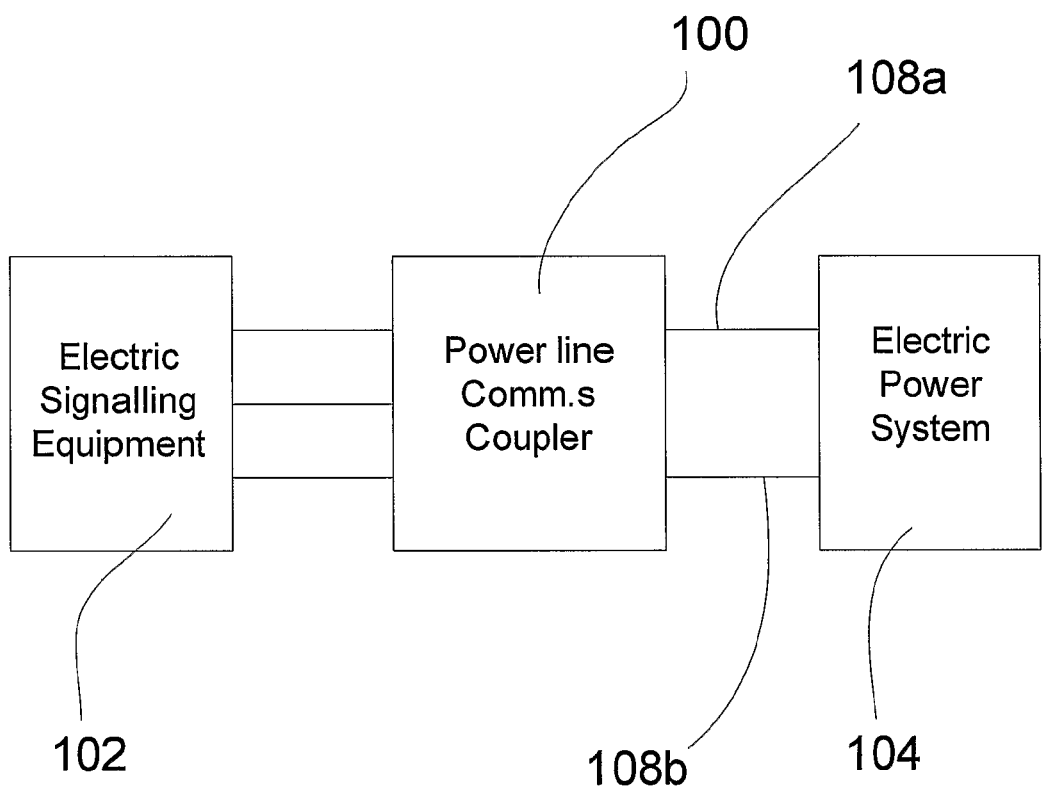
FIG. 3 is a schematic diagram showing electric signalling equipment in electrical communication with an electric power system by way of a power line communications coupler.

An embodiment of the invention 10 is a combined fuse holder and signal coupler between a signal system and an electrical power system as illustrated in FIG. 1 and FIG. 2 comprising:

a typical power line communications coupling circuit 11 built on a potted Printed Circuit Board insert 12 comprising of an isolation capacitor 14a, 14b on each phase 16a, 16b connecting across the primary winding 18 of an isolation/matching transformer 20 with the secondary winding 22 terminating at a small impedance matching capacitor 24. Only low voltage signals are transferred via the isolation transformer 20 and a screened signal cable 26 (rated for use in an electrical environment that could be a Belden 8762 single pair screened cable) to and from the signal equipment 28. The capacitor 24 and transformer 20 have been selected and laid out on a printed circuit board 12 to ensure good frequency coupling response and matching impedance between the electrical system 30 and the signal system 28;

an integrated fuse holder 44 consisting of a guide tube 32 open at both ends to permit moisture to drain out freely and sprung contact 34 for a high current rupturing fuse 36 likely to be accepted by most electrical authorities globally where one end of the fuse 36 is in contact via the existing host fuse holder contact 38 with active phase 16a of the high current electrical system 30 and the other end feeds the first capacitor 14a via an integrated sprung contact 34;

an integrated indicator light 40 to directly indicate when the physical coupling to the electrical system 30 is of a low impedance with a specific pull down resistor 42b to ensure a contact but high impedance connection is not indicated as good;

an integrated indicator light 40 to expire after approximately two years or when the isolation capacitors 14a, 14b have eventually sustained sufficient damage from ongoing power spikes to no longer be effective conductors or isolation capacitors;

a standard heavy duty host fuse holder 44 that could be manufactured by Cavanna and could be of model DPA likely be accepted by most electrical authorities globally, encapsulating the Potted Printed Circuit Board insert 12 holding all the circuitry described in this specification, the integrated fuse 36 and the indicator light 40;

an integrated resistor network 46 located near the integrated fuse holder 44 sprung contact 34 able to generate sufficient heat to dry out contacts 46 normally dried out by the normal high current use of the host fuse holder 44 and also ensuring a small wetting current continually circulates though the high current fuse 36, heavy duty fuse holder assembly 12, 44 and physical connections 16a, 16b to the electrical system 30 to stimulate low impedance contact through the chain of contacts for the power line signal.

Figure 4:
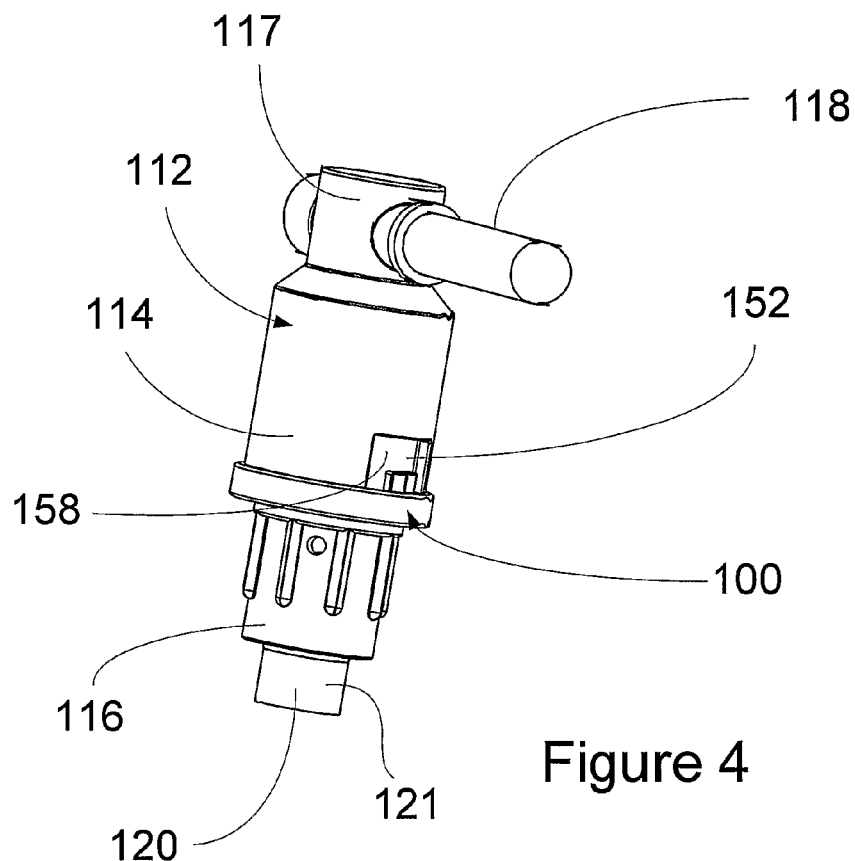
FIG. 4 is a diagrammatic illustration of a perspective view of the power line communications coupler shown in FIG. 3.

The power line communications coupler 100 shown in FIG. 4 functions in an analogous manner to that of the embodiment of the invention shown in FIGS. 1 and 2. That is, the coupler 100 is used to effect signal coupling between electric signalling equipment 102 and an electric power system 104. The power line communications coupler 100 is adapted to receive electric data signals from said signalling equipment 102 and send said electric data signals to one or more power line communication equipment end points of the electric power system 104. Further, the power line communications coupler 100 is adapted to receive electric data signals from the signalling equipment 102 and send the electric data signals to one or more intermediate power line communication equipment repeater systems that form part of the electric power system 104.

Figure 5:
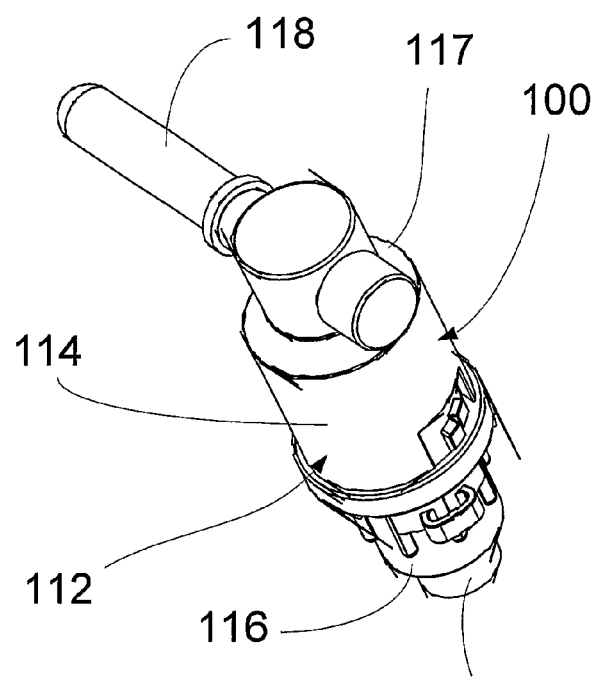
FIG. 5 is a diagrammatic illustration of another perspective view of the power line communications coupler shown in FIG. 3.
Figure 6:
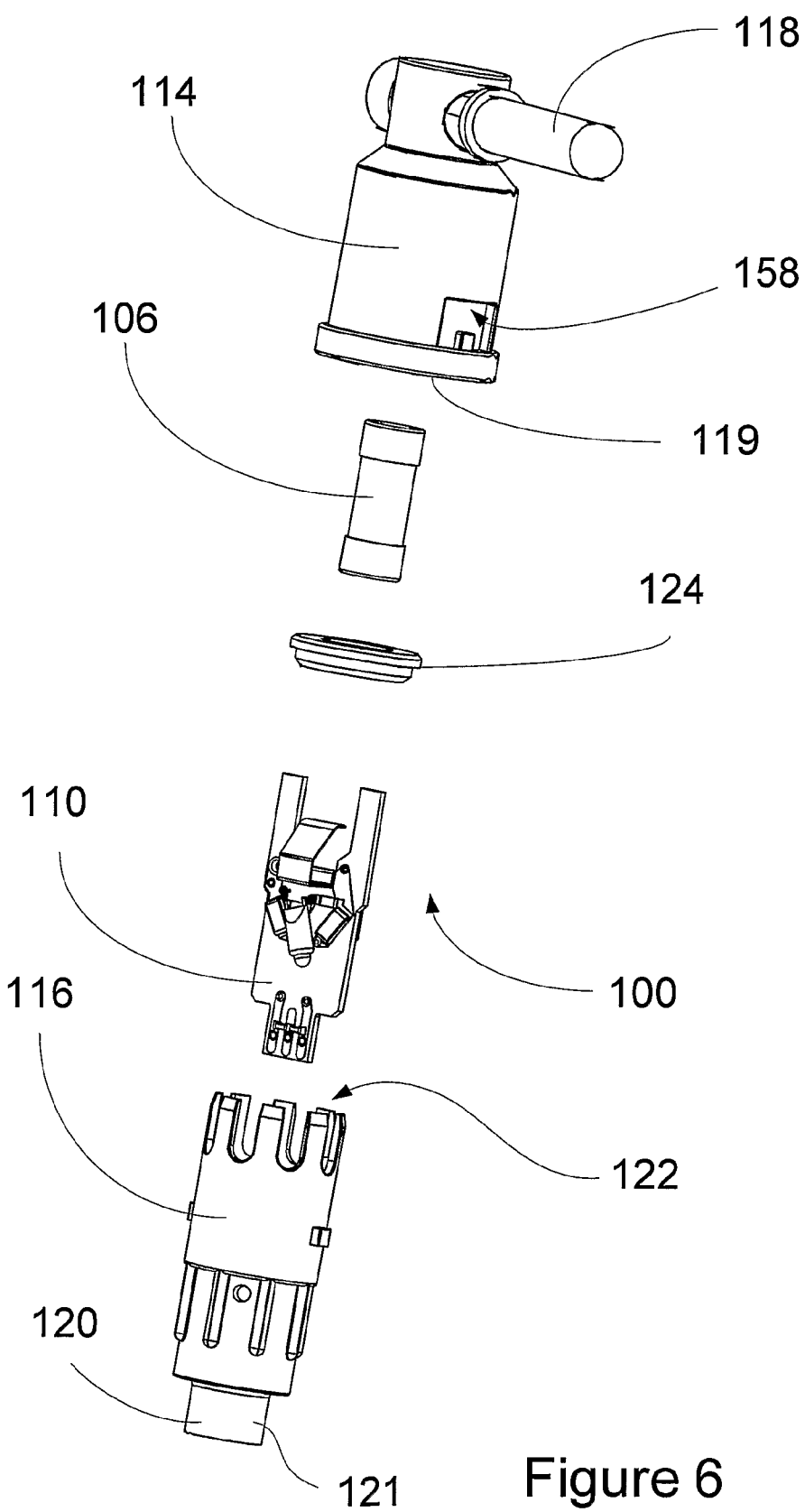
FIG. 6 is a diagrammatic illustration of an exploded view of the power line communications coupler shown in FIG. 3.
Figure 7:
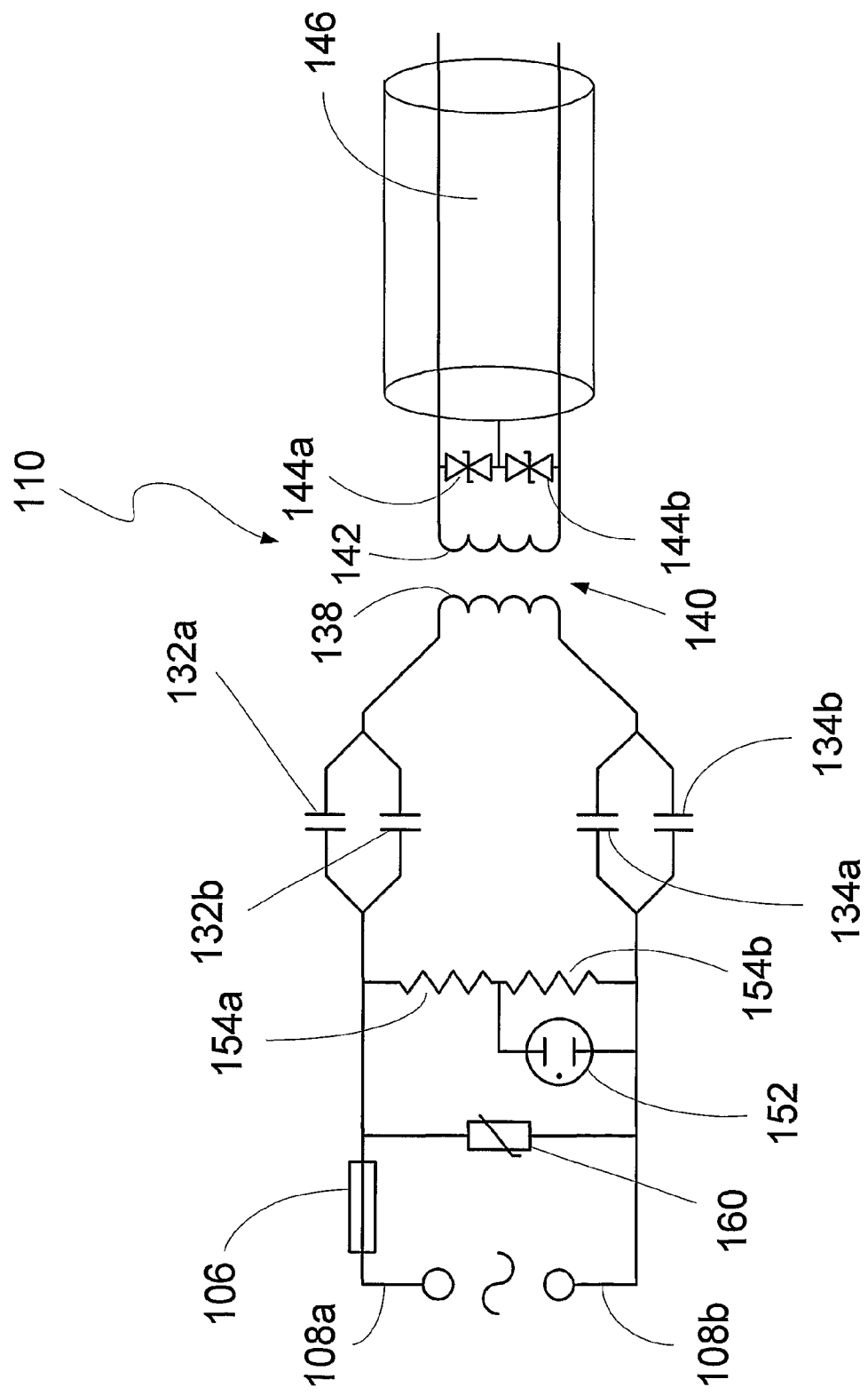
FIG. 7 is a circuit diagram of a signal coupler of the power line communications coupler shown in FIG. 3.
Figure 8:
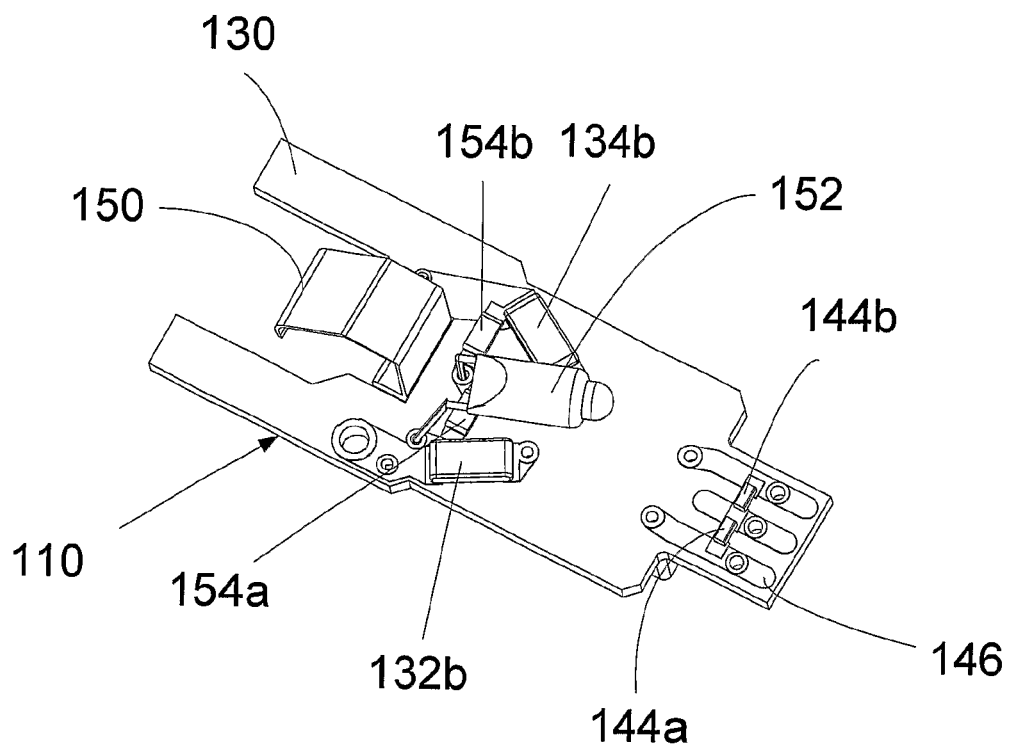
FIG. 8 is a diagrammatic illustration of a perspective view of a top side of the signal coupler shown in FIG. 7.
Figure 9:
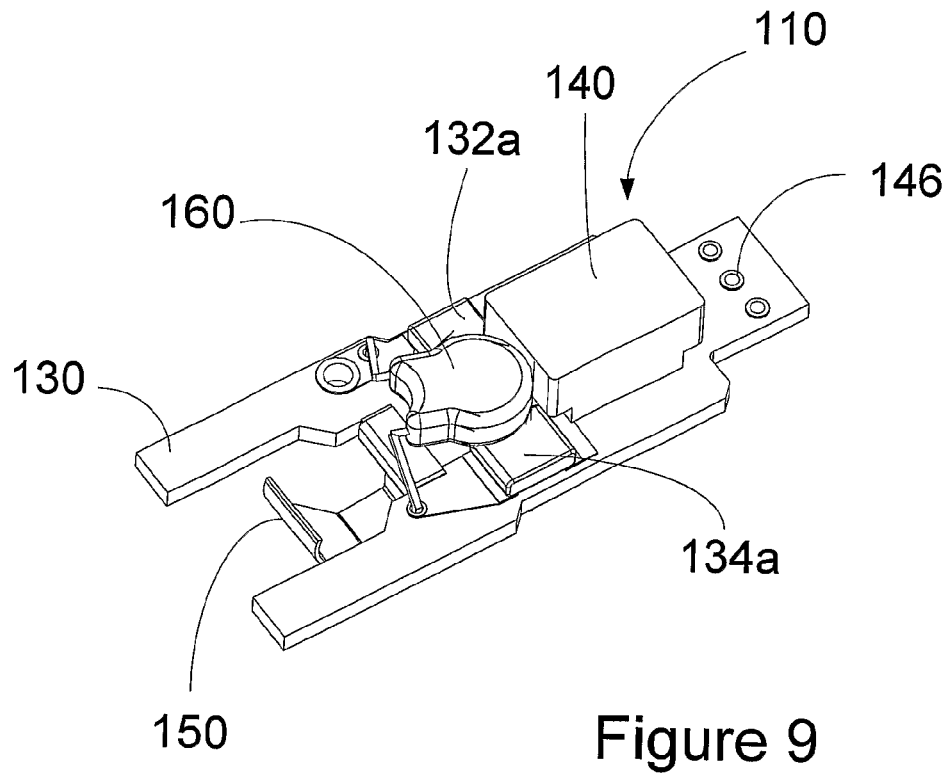
FIG. 9 is a diagrammatic illustration of a perspective view of a bottom side of the signal coupler shown in FIG. 7.
Figure 10:
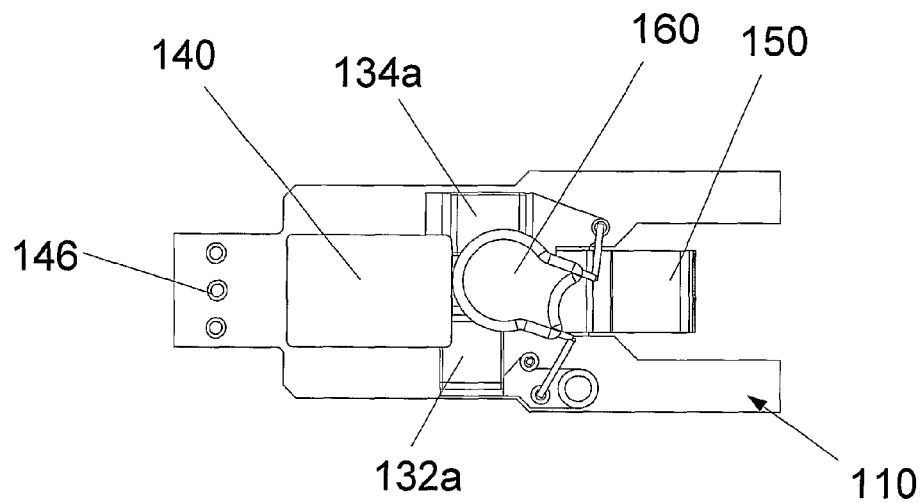
FIG. 10 is a diagrammatic illustration of a bottom view of the signal coupler shown in FIG. 7.
Figure 11:
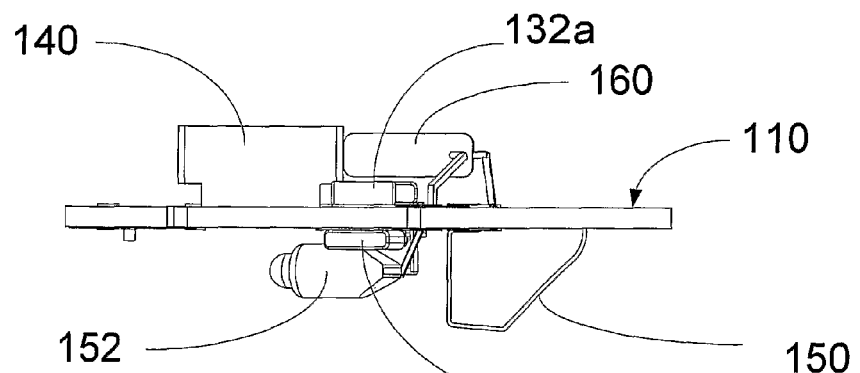
FIG. 11 is a diagrammatic illustration of a side view of the signal coupler shown in FIG. 7.
Figure 12:
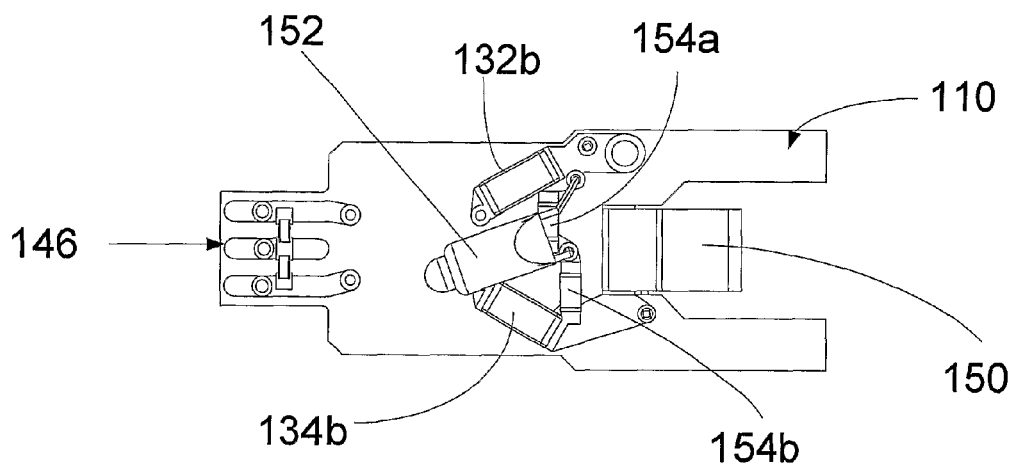
FIG. 12 is a diagrammatic illustration of a top view of the signal coupler shown in FIG. 7.

As particularly shown in FIGS. 4 to 6, the coupler 100 includes a fuse 106 coupleable to a power line 108a, 108b of the electric power system 104. The coupler 100 also includes a signal coupler 110 in electrical communication with the fuse and couplable to the signalling equipment 102. The coupler 100 includes a generally hollow cylindrical housing 112 that is formed in the following two intermatable parts:

a. The fuse holder 114; and
b. The coupling head 116.

The fuse holder 114 is generally cylindrical and includes a right angle active phase contact 118 at a first end 117. The right angled active phase contact 118 is used to electrically connect the coupler 100 to an insulation piercing probe (not shown) coupled to an active phase power line 108a of the electric system 104. Alternatively, the fuse holder 114 includes an in-line active phase contact (not shown) for electrically connecting to the insulation piercing probe (not shown) coupled to the active phase power line 108a of the electric system 104. An open end 119 of the cylindrical fuse holder 114 is shaped to receive, and securely seat therein, the fuse 106.

The coupler 100 includes an annular spacer 124 seated in the fuse holder 114. The fuse 106 extends through the spacer 124 when seated in the fuse housing 114. The spacer 124 preferably locates the fuse 106 in position for electrical connection to the signal coupler 110 and electrically isolates the fuse 106 from the internal peripheral walls of the housing 112. The fuse 106 is preferably a high rupture current fuse.

A first end 121 of the generally cylindrical coupling head 116 includes a socket 120 that is shaped to receive a screened mains rated signal cable (not shown). Another open end 122 of the coupling head 116 is shaped to receive, and securely seat therein, the signal coupler 110 (the operation of the signal coupler is described in further detail below).

The open ends 117, 122 of the fuse holder 114 and the coupler head 116 include interlocking parts. For example, the open ends 117, 122 are coupled together by way of respective snap lock male and female interlocking parts. Alternatively, the open ends 117, 122 are be secured together by way of corresponding helical threads. Otherwise, the open ends 117, 122 of the fuse holder 114 and the coupler head 116 can be coupled together by way of any other suitable means. The fuse 106 and the signal coupler 110 are substantially arranged within the housing 112 when the fuse holder 114 and the coupling head 116 are coupled together in the described manner.

As particularly shown in FIGS. 7 to 12, the signal coupler 110 includes a typical power line communications coupling circuit built on a potted printed circuit board 130. The signal coupler 110 includes parallel isolation capacitors 132a, 132b and 134a, 134b on each phase 108a, 108b connecting across the primary winding 138 of the isolation/matching transformer 140 (preferably PE-68629). The capacitors 132a and 132b are preferably 10 nF and 1.5 nF. The capacitors 134a and 134b are preferably 4.7 nF and 1.5 nF. The capacitors of each pair are disposed on opposite sides of the printed circuit board 130. The capacitors of each pair are not arranged in parallel on opposite sides of the board to reduce interference therebetween. The secondary winding 142 terminating at diodes 144a, 144b (preferably TVS 0603 30V). Only low voltage signals are transferred via the isolation transformer 140 and a screened signal cable 146 (rated for use in an electrical environment that could be a Belden 8762 single pair screened cable) to and from the electric signalling equipment 102. The transformer 140 has been selected and laid out on a printed circuit board 130 to ensure good frequency coupling response and matching impedance between the electric power system 104 and the electric signalling system 102.

The integrated fuse holder 114 includes a guide tube (not shown) open at both ends to permit moisture to drain out freely and a sprung contact 150 for the high current rupturing fuse 106. The fuse 106 is likely to be accepted by most electrical authorities globally. One end of the fuse 106 is in electrical contact, via the existing host fuse holder contact 118, with active phase 108a of the high current electric power system 104. The other end of the fuse 106 feeds the parallel pair of isolation capacitors 132a, 132b via an integrated sprung contact 150. The parallel capacitors 132a, 132b address high end and low end frequencies.

The signal coupler 110 includes an integrated indicator light 152 to directly indicate when the physical coupling to the electric power system 104 is of a low impedance with a specific pull down resistor 154b (100 KOhms) to ensure a contact but high impedance connection is not indicated as good. The integrated indicator light 152 may expire after approximately two years, or when the isolation capacitors 132a, 132b and 134a, 134b have eventually sustained sufficient damage from ongoing power spikes to no longer be effective conductors or isolation capacitors. The housing 112 includes an aperture 158 through which the indicator can be viewed.

The fuse holder 114 is, for example, a standard heavy duty host fuse holder 114 that is by Cavanna and could be of model DPA likely be accepted by most electrical authorities globally. The fuse holder 114 preferably encapsulates the potted printed circuit board 130 holding all the circuitry described in this embodiment of the invention, the integrated fuse 106 and the indicator light 152.

The resistors 154a, 154b (68 KOhms, 100 KOhms), located near the integrated fuse holder 114, the sprung contact 150 are able to generate sufficient heat to dry out contacts normally dried out by the normal high current use of the host fuse holder 114 and also ensuring a small wetting whetting current continually circulates though the high current fuse 106, heavy duty fuse holder assembly and physical connections 108a, 108b to the electric power system 104 to stimulate low impedance contact through the chain of contacts for the power line signal.

The signal coupler 110 also includes a fuse 160 (preferably MOV V300LA4) to protect the circuit from spikes. The fuse 160 is preferably a quick acting 125 Volt, 2 Amp fuse.

Figure 13:
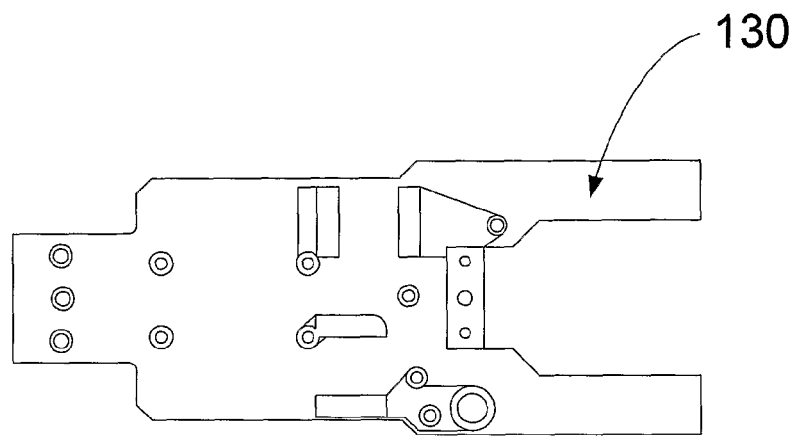
FIG. 13 is a diagrammatic illustration of a bottom view of a printed circuit board of the signal coupler shown in FIG. 7.
Figure 14:
FIG. 14 is a diagrammatic illustration of a side view of a printed circuit board of the signal coupler shown in FIG. 7.
Figure 15:
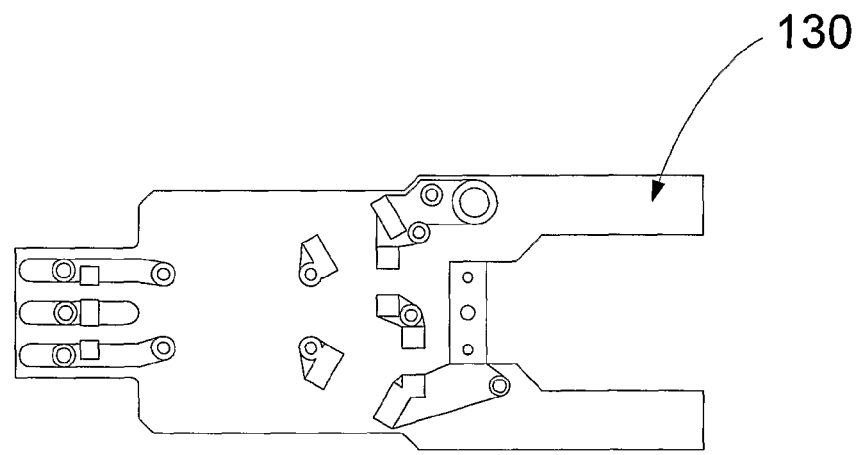
FIG. 15 is a diagrammatic illustration of a top view of a printed circuit board of the signal coupler shown in FIG. 7.

The arrangement of the tracks of the printed circuit board 130 of the signal coupler 110 are shown in FIGS. 13 to 15. Tracks are laid on both sides of the board 130. The board 130 is of sufficient size for installation within the fuse holder 114.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

Throughout this specification, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not, and should not be taken as, an acknowledgment or any form of suggestion that the prior art forms part of the common general knowledge in Australia.

The invention claimed is:

1. A power line communications coupler for effecting signal coupling between electric signaling equipment and an electric power system, said coupler comprising:
   a housing defining an interior;
   a fuse disposed within the interior of the housing, the fuse being configured to electrically couple to a power line of said electric power system; and
   a signal coupler disposed within the interior of the housing, the signal coupler being configured to couple to the fuse via a sprung contact, the signal coupler also being configured to electrically couple to said signaling equipment via a matching transformer that transfers only low voltage signals to the signaling equipment.

2. The coupler claimed in claim 1, wherein the housing includes a first part defining a host fuse holder and a second part defining a coupling head, the host fuse holder being configured to hold the fuse, the coupling head being configured to hold the signal coupler.

3. The coupler claimed in claim 1, further comprising circuitry for effecting a wetting current through the fuse.

4. The coupler claimed in claim 1, further comprising an indicator for indicating a status of electrical coupling between the signaling equipment and to the electric power system.

5. The coupler claimed in claim 4, wherein the indicator indicates when physical coupling to the electric power system is of low impedance.

6. The coupler claimed in claim 4, wherein the indicator is a light.

7. The coupler claimed in claim 6, wherein the light is visible externally from the coupler.

8. The coupler claimed in claim 1, including circuitry for heating internal components of the coupler.

9. The coupler claimed in claim 8, wherein the circuitry for heating includes one or more resistors.

10. The coupler claimed in claim 1, wherein, in use, the coupler receives electric data signals from said signaling equipment and sends said electric data signals to one or more power line communication equipment end points of the electric power system.

11. The coupler claimed in claim 1, wherein, in use, the coupler receives electric data signals from said signalling signaling equipment and sends said electric data signals to one or more intermediate power line communication equipment repeater systems of said electric power system.

12. The coupler claimed in claim 1, wherein the fuse is a high rupture current fuse.

* * * * *

UNITED STATES PATENT AND TRADEMARK OFFICE
CERTIFICATE OF CORRECTION

PATENT NO. : 8,310,081 B2
APPLICATION NO. : 12/295807
DATED : November 13, 2012
INVENTOR(S) : Yelland et al.

It is certified that error appears in the above-identified patent and that said Letters Patent is hereby corrected as shown below:

In the Specification

Col. 5, line 24: "a small wetting whetting" should read --a small wetting--

In the Claims

Col. 6, line 26, claim 4: "equipment and to the electric" should read --equipment and the electric--

Col. 6, lines 44-45, claim 11: "from said signalling signaling equipment" should read --from said signaling equipment--

Signed and Sealed this
Twenty-fifth Day of February, 2014

Michelle K. Lee
*Deputy Director of the United States Patent and Trademark Office*